US008050554B2

(12) United States Patent
Jang et al.

(10) Patent No.: US 8,050,554 B2
(45) Date of Patent: Nov. 1, 2011

(54) FAULT LOCALIZATION APPARATUS FOR OPTICAL LINE USING SUBCARRIER MULTIPLEXING (SCM) MONITORING SIGNAL AND METHOD THEREOF

(75) Inventors: Seung-Hyun Jang, Daejeon (KR); Chul-Soo Lee, Daejeon (KR); Eui Suk Jung, Daejeon (KR); Byoung Whi Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 801 days.

(21) Appl. No.: 11/929,849

(22) Filed: Oct. 30, 2007

(65) Prior Publication Data

US 2008/0131114 A1      Jun. 5, 2008

(30) Foreign Application Priority Data

Dec. 5, 2006   (KR) .................. 10-2006-0122572
May 23, 2007   (KR) .................. 10-2007-0050243

(51) Int. Cl.
    *H04B 10/08*    (2006.01)
(52) U.S. Cl. ................... 398/13; 398/10; 398/17
(58) Field of Classification Search ............. 398/10–14, 398/17, 30–34, 76
    See application file for complete search history.

(56) References Cited

U.S. PATENT DOCUMENTS

| 6,285,475 | B1 |  | 9/2001 | Fee | |
|---|---|---|---|---|---|
| 2003/0165286 | A1 | * | 9/2003 | Ikushima et al. | 385/24 |
| 2006/0120727 | A1 | * | 6/2006 | Lee et al. | 398/135 |
| 2006/0222364 | A1 | * | 10/2006 | Chung et al. | 398/72 |
| 2006/0222365 | A1 | * | 10/2006 | Jung et al. | 398/72 |
| 2007/0133987 | A1 | * | 6/2007 | Xu et al. | 398/67 |
| 2007/0189772 | A1 | * | 8/2007 | Hyun et al. | 398/71 |

FOREIGN PATENT DOCUMENTS

| KR | 1020050028987 A | 3/2005 |
|---|---|---|
| KR | 1020050118863 A | 12/2005 |

OTHER PUBLICATIONS

U. Hilbk et al. "*Selective OTDR Measurements at the central office of individual fiber links in a PON*", p. 54, OFC '97 Technical Digest.

\* cited by examiner

*Primary Examiner* — Dzung Tran

(57) ABSTRACT

Provided are a fault localization apparatus based on an optical communication network and a method thereof. In the fault localization apparatus according to the present invention, a downstream light source is used as a monitoring optical signal instead of using an additional monitoring light source and a subcarrier multiplexing (SCM) monitoring pulse signal of a certain frequency band having no interference with a frequency band of a downstream data signal is used and thus a fault position may be detected at low cost.

9 Claims, 12 Drawing Sheets

FAULT LOCALIZATION APPARATUS FOR OPTICAL LINE USING SUBCARRIER MULTIPLEXING (SCM) MONITORING SIGNAL AND METHOD THEREOF

CROSS-REFERENCE TO RELATED PATENT APPLICATION

This application claims the benefit of Korean Patent Application No. 10-2006-0122572, filed on Dec. 5, 2006 and Korean Patent Application No. 10-2007-0050243, filed on May 23, 2007, in the Korean Intellectual Property Office, the disclosures of which are incorporated herein in their entirety by reference.

BACKGROUND OF THE INVENTION

1. Field of the Invention

The present invention relates to a fault localization apparatus based on an optical communication network and a method thereof, and more particularly, to a fault localization apparatus for an optical line using a downstream light source as a monitoring light source instead of using an additional monitoring light source, and a method thereof.

The present invention was supported by the Information Technology (IT) Research & Development (R&D) program of the Ministry of Information and Communication (MIC) [Project management number: 2005-S-401-02, Project title: Optical Subscriber and Access Network Technology].

2. Description of the Related Art

An x digital subscriber line (xDSL) technology has been developed and is being currently used to provide data services to a subscriber by using a conventional telephone line. As well as this, a technology for data services by a cable network using a coaxial cable has been suggested and is currently being developed.

The above conventional technologies for data services do not seem to have any major problems in consideration of the amount of Internet traffic currently used by a subscriber. However, assuming that super-high-speed data services such as telecommuting, teleconferencing, services of moving pictures having as high quality as high-definition televisions (HDTVs), tele-education, and telemedicine services are generalized to common subscribers, the conventional technologies may not provide sufficiently high quality services for a broadband due to their restrictions in terms of bandwidths and distances.

An optical communication network technology is regarded as a conspicuous access method of providing sufficient broadband services to subscribers.

Optical fibers which are transmission media of optical signals used for the optical communication network, are buried under the ground and thus may be relatively easily cut or damaged by an external impact such as a natural calamity or construction which may impact the ground, compared to copper cables which are transmission media of electrical signals. If communication services to subscribers are discontinued due to one of the above reasons, this may reduce reliability of the communication network and may also reduces customer satisfaction. Therefore, when a fault occurs in the optical fibers, it is vital to find the position of the fault promptly and accurately so as to repair the fault.

A convention thesis entitled 'Optical Maintenance in passive optical networks (PONs)' (European Conference on Optical Communication, Vol 1, pp. 621-625, 20-24 Sep. 1998) discloses a technology that an optical time domain reflectometer (OTDR) having a light source for generating a monitoring wavelength different from a communication wavelength is included in a central base station and an optical band pass filter (BPF) for attenuation of the monitoring wavelength is disposed in front of an optical line terminal (OLT) so that a reflected light signal of the monitoring wavelength does not reach the OLT of the central base station.

According to the above technology, when a fault occurs in an optical line, an OTDR optical pulse signal transmitted as the monitoring wavelength is almost completely reflected from the position of the fault so that fault localization may be performed on the optical line. However, the above technology requires an additional monitoring light source and an additional optical BPF for attenuation of the monitoring light source and thus has a problem from an economical aspect.

Also, recently, research on fault localization apparatuses for an optical line in a wavelength division multiplexed-passive optical network (WDM-PON) which is regarded as a next generation optical communication network has been actively conducted. US Patent Publication No. 20060222364 entitled 'Fault localization apparatus for optical line in wavelength division multiplexed passive optical network' discloses a method of receiving upstream signals, checking a channel having a fault by whether a signal is input to a receiving terminal, operating a controller, and using a downstream light source which is normally used for data transmission as a monitoring light source by a switch.

A monitoring optical pulse signal generated by using the above method is inserted in the optical line and backward-scattered light is received by an OTDR receiver through an optical circulator and a tunable BPF. However, although the above method does not use an additional monitoring light source, the expensive tunable BPF is necessary to receive monitoring optical pulse signals.

SUMMARY OF THE INVENTION

The present invention provides a fault localization apparatus for an optical line using a downstream light source instead of an additional monitoring light source and an optical band pass filter (BPF) for attenuation of the monitoring light source.

According to an aspect of the present invention, there is provided a fault localization apparatus for an optical line in an optical communication network between a central base station and a subscriber, the apparatus including a monitoring pulse signal transmission unit which modulates a monitoring pulse signal to a signal of a certain frequency band having no interference with a frequency band of a downstream data signal; a coupler which combines the modulated monitoring pulse signal and the downstream data signal and outputs the combined signal to a downstream light source; and a monitoring pulse signal reception unit which detects a position of a fault in the optical line by extracting the monitoring pulse signal from an optical signal input through an optical fiber.

According to another aspect of the present invention, there is provided a fault localization apparatus for an optical line in an optical communication network between a central base station and a subscriber, the apparatus including a monitoring pulse signal transmission unit which modulates a monitoring pulse signal to a signal of a certain frequency band having no interference with a frequency band of a downstream data signal; a switch which outputs one of the modulated monitoring pulse signal and the downstream data signal to a downstream light source; and a monitoring pulse signal reception unit which detects a position of a fault in the optical line by extracting the monitoring pulse signal from an optical signal input through an optical fiber.

According to another aspect of the present invention, there is provided a fault localization apparatus for an optical line in an optical communication network between a subscriber and a central base station which multiplexes a plurality of downstream data signals, the apparatus including a monitoring pulse signal transmission unit which modulates a monitoring pulse signal to a signal of a certain frequency band having no interference with a frequency band of the downstream data signals; a switch which transmits the modulated monitoring pulse signal to one of a plurality of channels of the downstream data signals; and a plurality of couplers which are disposed at each channel of the downstream data signals, combine the modulated monitoring pulse signal and a downstream data signal, and output the combined signal to a downstream light source; and a monitoring pulse signal reception unit which detects a position of a fault in the optical line by extracting the monitoring pulse signal from an optical signal input through an optical fiber.

According to another aspect of the present invention, there is provided a fault localization method for an optical line in an optical communication network between a central base station and a subscriber, the method including modulating a monitoring pulse signal to a signal of a certain frequency band having no interference with a frequency band of a downstream data signal; combining the modulated monitoring pulse signal and the downstream data signal and outputting the combined signal to a downstream light source; and detecting the position of the fault in the optical line by extracting the monitoring pulse signal from an optical signal input through an optical fiber.

According to another aspect of the present invention, there is provided a fault localization method for an optical line in an optical communication network between a central base station and a subscriber, the method including modulating a monitoring pulse signal to a signal of a certain frequency band having no interference with a frequency band of a downstream data signal; outputting one of the modulated monitoring pulse signal and the downstream data signal to a downstream light source; and detecting the position of the fault in the optical line by extracting the monitoring pulse signal from an optical signal input through an optical fiber.

According to another aspect of the present invention, there is provided a fault localization method for an optical line in an optical communication network between a subscriber and a central base station which multiplexes a plurality of downstream data signals, the method including modulating a monitoring pulse signal to a signal of a certain frequency band having no interference with a frequency band of the downstream data signals; inputting the modulated monitoring pulse signal to one of a plurality of channels of the downstream data signals; combining the modulated monitoring pulse signal and a downstream data signal, and outputting the combined signal to a downstream light source; and detecting the position of the fault in the optical line by extracting the monitoring pulse signal from an optical signal input through an optical fiber.

According to another aspect of the present invention, there is provided an optical communication network for performing fault localization on an optical line, the network including a central base station which outputs a plurality of downstream data signals and a monitoring pulse signal generated in order to detect the position of the fault in the optical line as an optical signal by a plurality of downstream light sources disposed at a plurality of channels of the downstream data signals, and outputs a downstream optical signal generated by multiplexing the optical signal to a first optical fiber; a local base station which is connected to the central base station by the first optical fiber and outputs a downstream optical signal generated by demultiplexing the multiplexed downstream optical signal by wavelengths to a second optical fiber; and a subscriber terminal which is connected to the local base station by the second optical fiber and receives a corresponding downstream optical signal through the second optical fiber.

According to another aspect of the present invention, there is provided a computer readable recording medium having recorded thereon a computer program for executing a fault localization method for an optical line in an optical communication network between a central base station and a subscriber.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
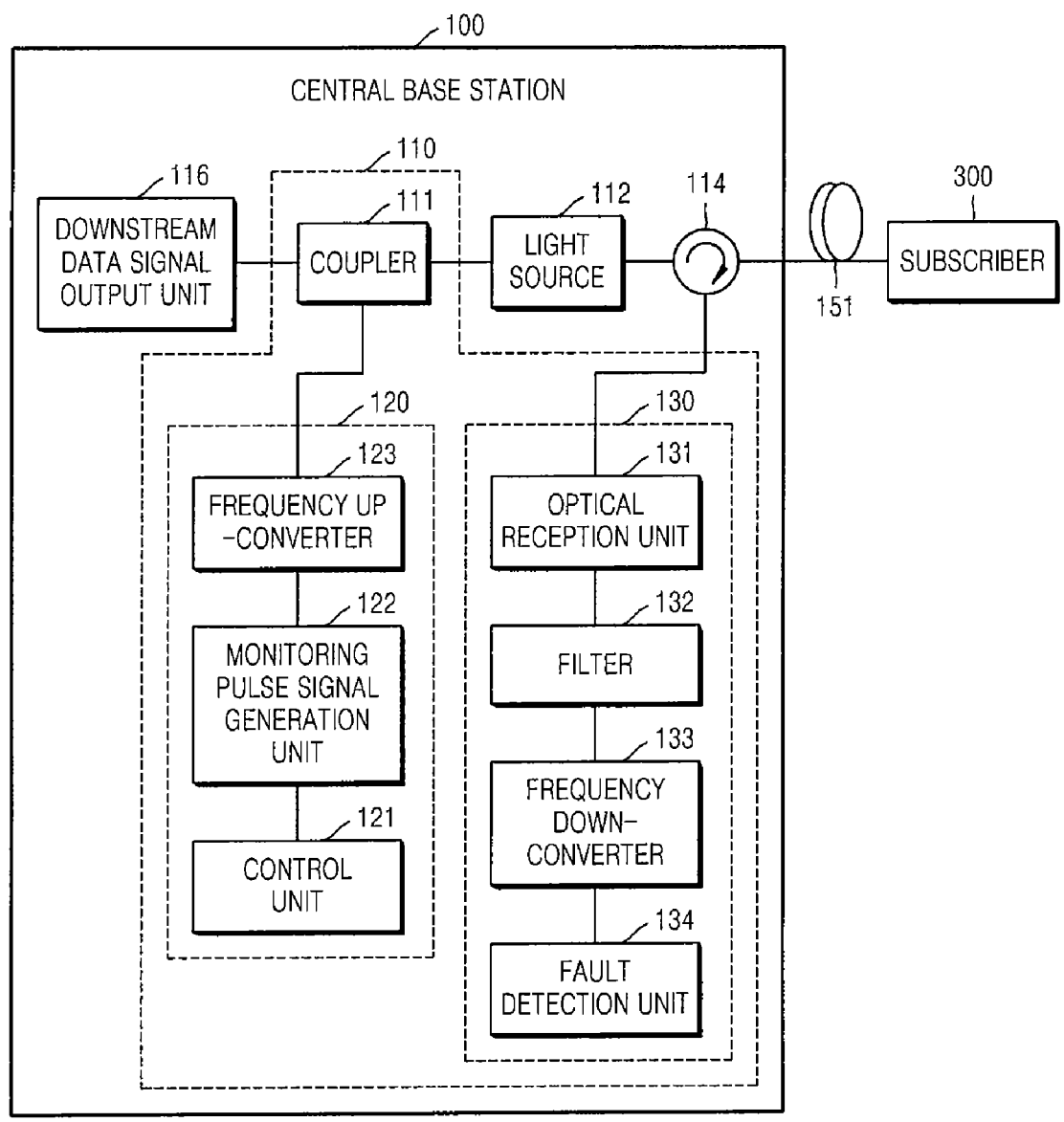
FIG. 1 is a block diagram of an optical communication network including a fault localization apparatus for an optical line, according to an embodiment of the present invention.

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted when it may make the subject matter of the present invention unclear.

Figure 10:
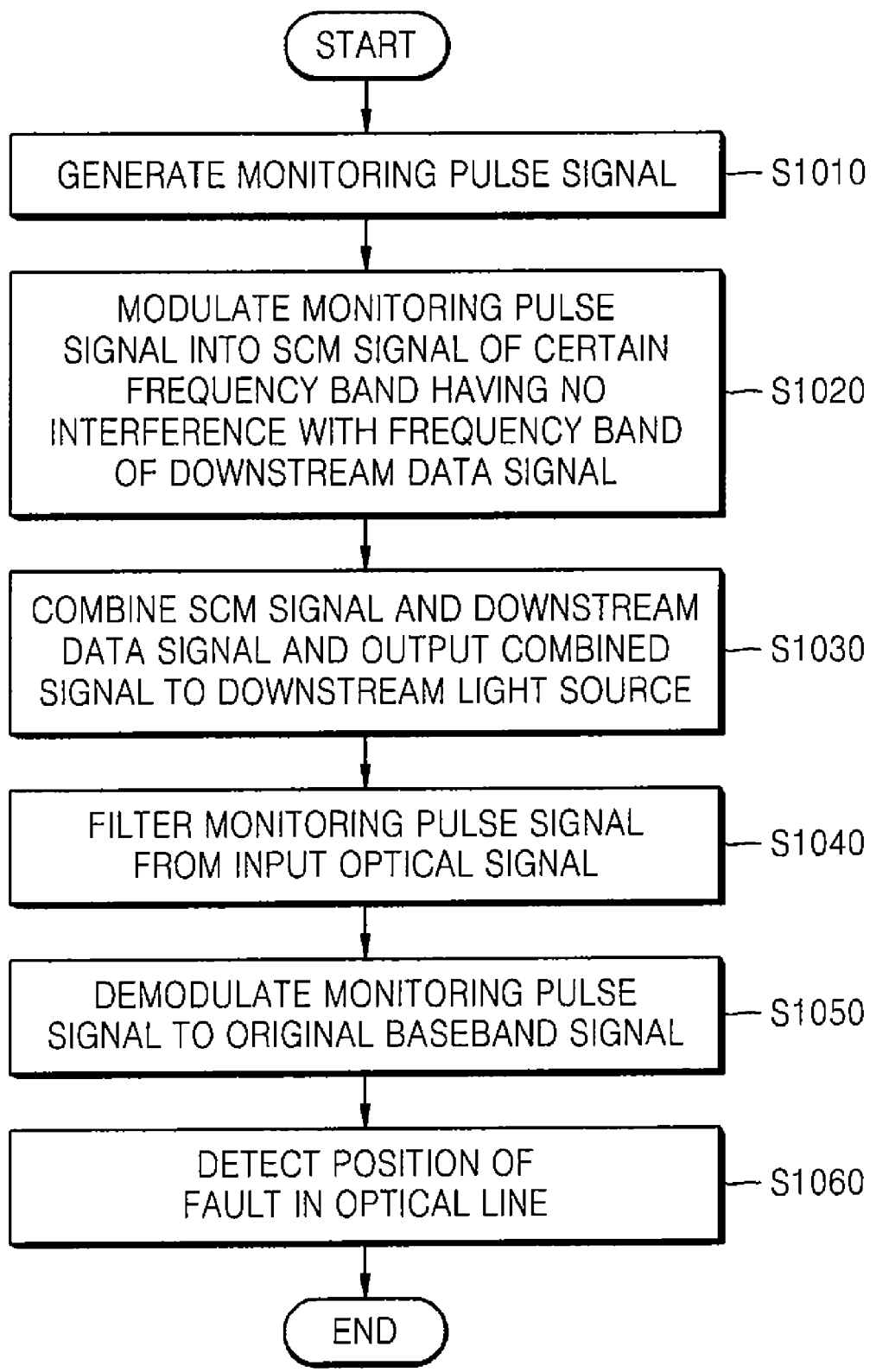
FIGS. 10 through 12 are flowcharts of a fault localization method for an optical line, according to embodiments of the present invention.

FIG. 1 is a block diagram of an optical communication network including a fault localization apparatus 110 for an optical line, according to an embodiment of the present invention. FIG. 10 is a flowchart of a fault localization method for an optical line, according to an embodiment of the present invention. Operations of the optical communication network illustrated in FIG. 1 will now be described in conjunction with the flowchart of FIG. 10.

Referring to FIG. 1, the optical communication network includes a central base station 100 and a subscriber terminal 300 which communicate with each other through a first optical fiber 151.

The central base station 100 includes the fault localization apparatus 110, a downstream light source 112 which converts a downstream data signal into an optical signal and outputs the optical signal, an optical circulator 114, and a downstream data signal output unit 116.

The fault localization apparatus 110 includes a monitoring pulse signal transmission unit 120 which modulates a monitoring pulse signal to a signal of a certain frequency band having no interference with the frequency band of the downstream data signal, a coupler 111 which combines the modulated monitoring pulse signal and the downstream data signal and outputs the combined signal to the downstream light source 112, and a monitoring pulse signal reception unit 130 which detects the position of the fault in the optical line by extracting the monitoring pulse signal from the optical signal input through the first optical fiber 151.

The monitoring pulse signal transmission unit 120 includes a control unit 121, a monitoring pulse signal generation unit 122, and a frequency up-converter 123.

The monitoring pulse signal reception unit 130 includes an optical reception unit 131, a filter 132, a frequency down-converter 133, and a fault detection unit 134.

In the monitoring pulse signal transmission unit 120, the monitoring pulse signal generation unit 122 generates the monitoring pulse signal in accordance with a control signal of the control unit 121 in operation S1010. The control unit 121 may control the monitoring pulse signal to be generated at a predetermined interval. The monitoring pulse signal output from the monitoring pulse signal generation unit 122 is modulated to a signal of the certain frequency band having no interference with the frequency band of the downstream data signal and is converted into a subcarrier multiplexing (SCM) monitoring pulse signal by the frequency up-converter 123 in operation S1020. The SCM monitoring pulse signal is transmitted to the coupler 111.

The coupler 111 is disposed between the downstream light source 112 and the downstream data signal output unit 116 and receives the SCM monitoring pulse signal from the frequency up-converter 123. The coupler 111 combines the SCM monitoring pulse signal and the downstream data signal output from the downstream data signal output unit 116, and outputs the combined signal to the downstream light source 112 in operation S1030.

The downstream light source 112 outputs a modulated optical signal and transmits the modulated optical signal to the optical circulator 114.

The optical circulator 114 transmits the optical signal through the first optical fiber 151 and transmits a reflected signal of the optical signal which is upwardly-input through the first optical fiber 151 to the monitoring pulse signal reception unit 130.

In the monitoring pulse signal reception unit 130, the optical reception unit 131 receives the reflected optical signal. Since the reflected optical signal includes both of the downstream data signal and the SCM monitoring pulse signal, the filter 132 filters only the SCM monitoring pulse signal in operation S1040. Since the SCM monitoring pulse signal is modulated to a signal of the certain frequency band having no interference with the frequency band of the downstream data signal, the SCM monitoring pulse signal may be filtered by an electrical band pass filter (BPF). The frequency down-converter 133 demodulates the filtered SCM monitoring pulse signal to a signal of an original frequency band, that is, a baseband in operation S1050. The demodulated monitoring pulse signal is input to the fault detection unit 134. The fault detection unit 134 detects the position of the fault in the optical line by analyzing waveforms of the demodulated monitoring pulse signal in operation S1060. The analyzing of the waveforms and the detecting of the position of the fault may be performed by using any one of various well-known methods.

Figure 2A:
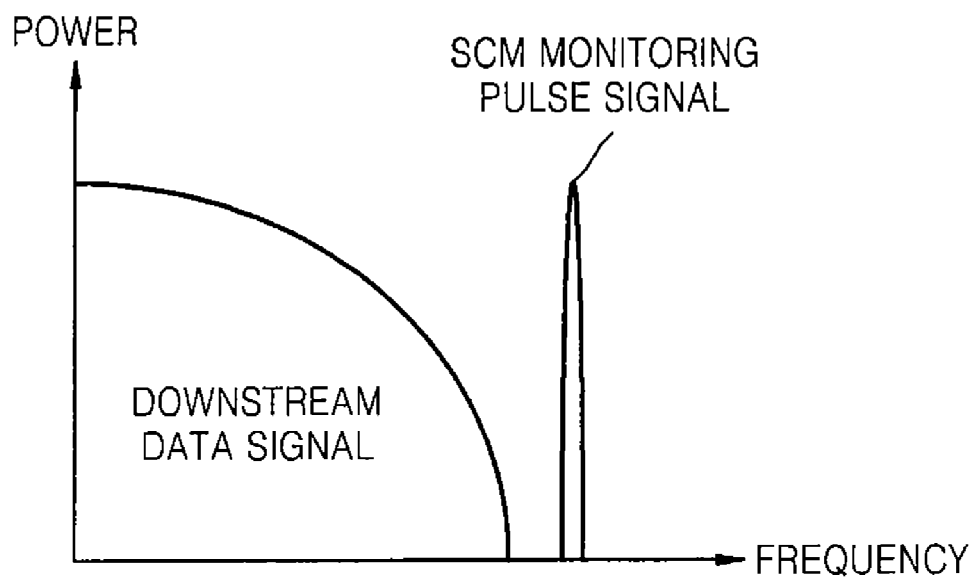
FIGS. 2A and 2B are graphs of output spectrums of a coupler of a central base station illustrated in FIG. 1, according to an embodiment of the present invention.
Figure 2B:
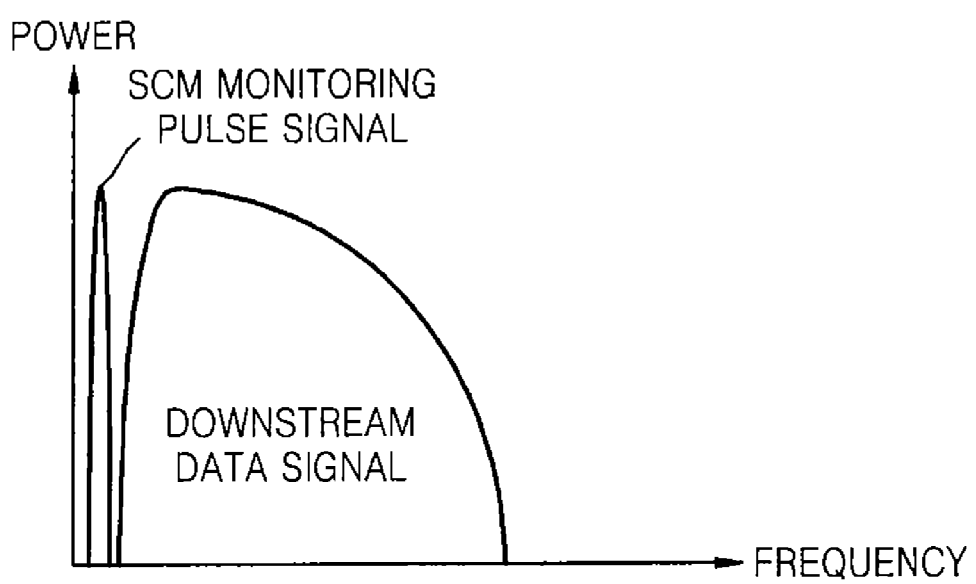

FIGS. 2A and 2B are graphs of output spectrums of the coupler 111 of the central base station 100 illustrated in FIG. 1, according to an embodiment of the present invention.

FIG. 2A shows an output spectrum when an SCM monitoring pulse signal is at a higher frequency band compared to a downstream data signal. FIG. 2B shows an output spectrum when the SCM monitoring pulse signal is at a lower frequency band compared to the downstream data signal. In both the cases illustrated in FIGS. 2A and 2B, a frequency band having no interference with the frequency band of the downstream data signal is selected.

Figure 3:
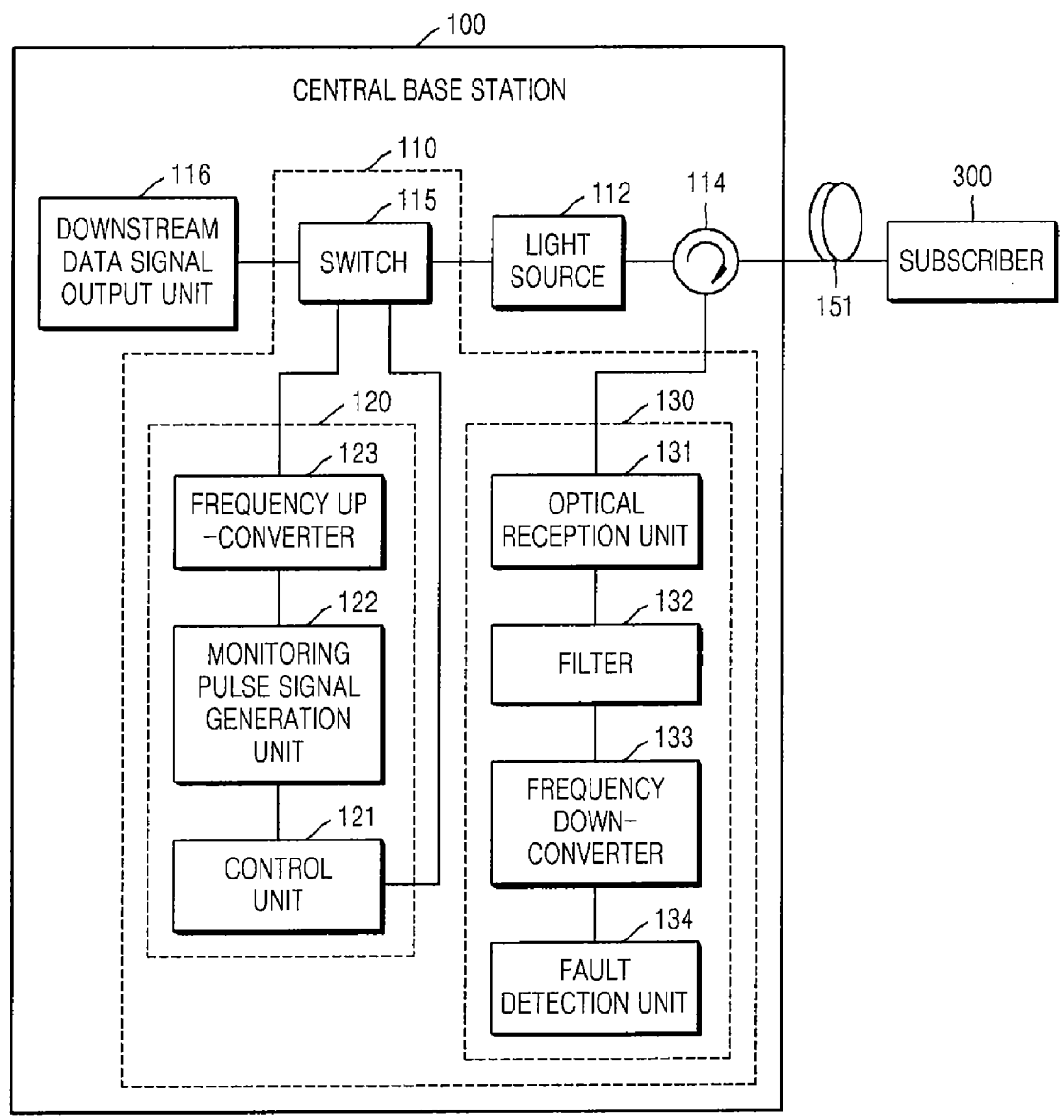
FIG. 3 is a block diagram of an optical communication network including a fault localization apparatus for an optical line, according to another embodiment of the present invention.
Figure 11:
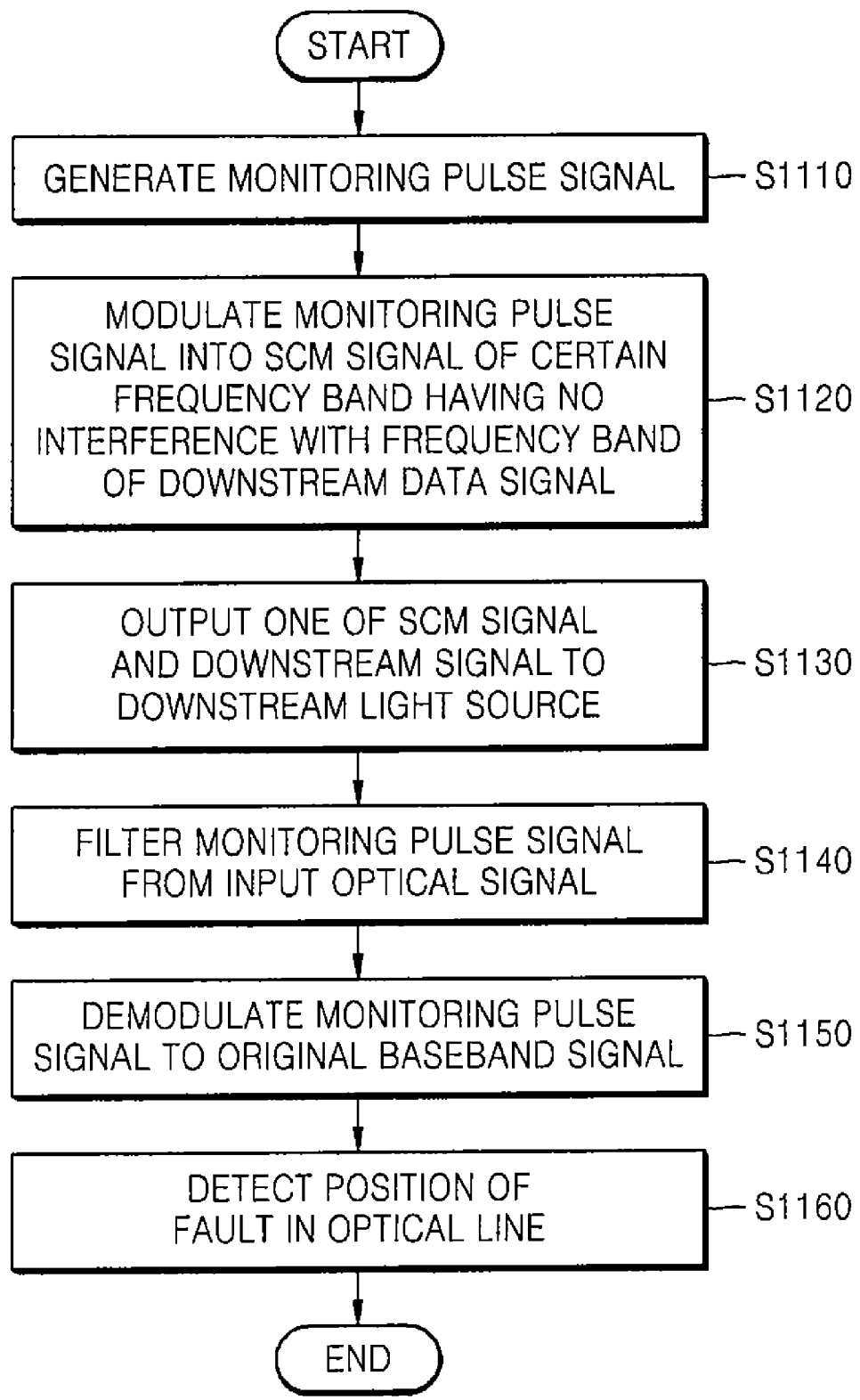

FIG. 3 is a block diagram of an optical communication network including a fault localization apparatus 110 for an optical line, according to another embodiment of the present invention. FIG. 11 is a flowchart of a fault localization method for an optical line, according to another embodiment of the present invention. Operations of the optical communication network illustrated in FIG. 3 will now be described in conjunction with the flowchart of FIG. 11.

Referring to FIG. 3, the optical communication network includes a central base station 100 and a subscriber terminal 300 which communicate with each other through a first optical fiber 151.

The central base station 100 includes the fault localization apparatus 110, a downstream light source 112 which converts a downstream data signal into an optical signal and outputs the optical signal, an optical circulator 114, and a downstream data signal output unit 116.

The fault localization apparatus 110 includes a monitoring pulse signal transmission unit 120 which modulates a monitoring pulse signal to a signal of a certain frequency band having no interference with the frequency band of the downstream data signal, a switch 115 which outputs one of the modulated monitoring pulse signal and the downstream data signal to the downstream light source 112, and a monitoring pulse signal reception unit 130 which detects the position of the fault in the optical line by extracting the monitoring pulse signal from the optical signal input through the first optical fiber 151.

The monitoring pulse signal transmission unit 120 includes a control unit 121, a monitoring pulse signal generation unit 122, and a frequency up-converter 123.

The monitoring pulse signal reception unit 130 includes an optical reception unit 131, a filter 132, a frequency down-converter 133, and a fault detection unit 134.

In the monitoring pulse signal transmission unit 120, the monitoring pulse signal generation unit 122 generates the monitoring pulse signal in accordance with a control signal of the control unit 121 in operation S1110. The control unit 121 may control the monitoring pulse signal to be generated at a predetermined interval. The monitoring pulse signal output from the monitoring pulse signal generation unit 122 is modulated to a signal of the certain frequency band having no interference with the frequency band of the downstream data signal and is converted into an SCM monitoring pulse signal by the frequency up-converter 123 in operation S1120. The SCM monitoring pulse signal is transmitted to the switch 115.

The switch 115 is disposed between the downstream light source 112 and the downstream data signal output unit 116 and receives the SCM monitoring pulse signal from the frequency up-converter 123. The switch 115 selects one of the downstream data signal and the SCM monitoring pulse signal in accordance with a control signal of the control unit 121 and outputs the selected signal to the downstream light source 112 in operation S1130. When the downstream data signal to be transmitted does not exist, the control unit 121 may control the SCM monitoring pulse signal to be transmitted at a predetermined interval so as to minimize the delay of the downstream data signal.

The downstream light source 112 outputs a modulated optical signal and transmits the modulated optical signal to the optical circulator 114.

The optical circulator 114 transmits the optical signal obtained by modulating the downstream data signal or the SCM monitoring pulse signal through the first optical fiber 151 and transmits a reflected signal of the optical signal which is upwardly-input through the first optical fiber 151 to the monitoring pulse signal reception unit 130.

In the monitoring pulse signal reception unit 130, the optical reception unit 131 receives the reflected optical signal. Since the reflected optical signal may include both of the downstream data signal and the SCM monitoring pulse signal, the filter 132 filters only the SCM monitoring pulse signal in operation S1140. Since the SCM monitoring pulse signal is modulated to a signal of the certain frequency band having no interference with the frequency band of the downstream data signal, the SCM monitoring pulse signal may be filtered by an electrical BPF. The frequency down-converter 133 demodulates the filtered SCM monitoring pulse signal to a signal of an original frequency band, that is, a baseband in operation S1150. The demodulated monitoring pulse signal is input to the fault detection unit 134. The fault detection unit 134 detects the position of the fault in the optical line by analyzing waveforms of the demodulated monitoring pulse signal in operation S1160. The analyzing of the waveforms and the detecting of the position of the fault may be performed by using any one of various well-known methods.

Output spectrums of the switch 115 of the central base station 100 according to the current embodiment may be the same as the output spectrums illustrated in FIGS. 2A and 2B.

Figure 4:
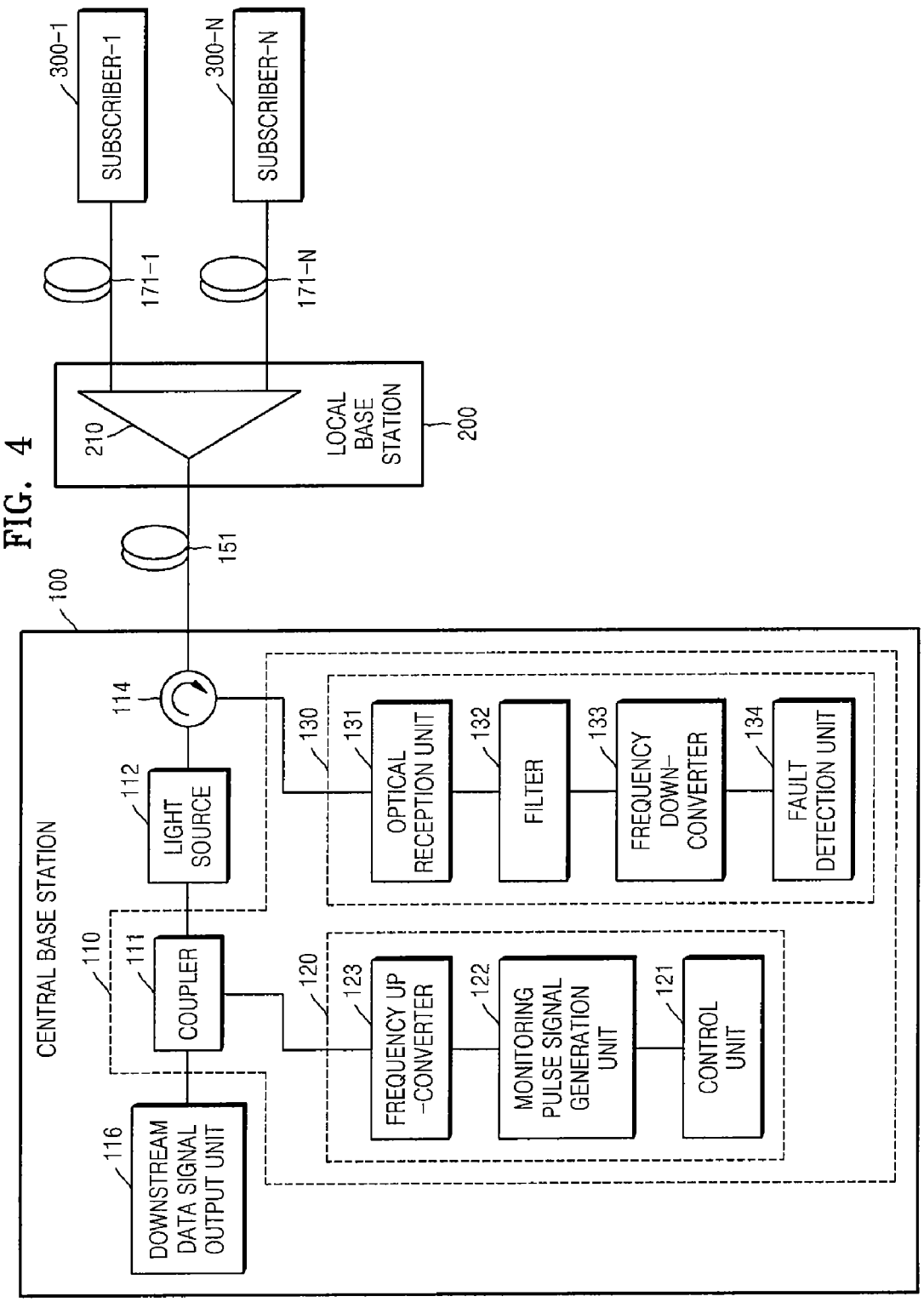
FIG. 4 is a block diagram of an optical communication network including a fault localization apparatus for an optical line when the optical communication network illustrated in FIG. 1 is extended for a plurality of subscribers, according to an embodiment of the present invention.

FIG. 4 is a block diagram of an optical communication network including a fault localization apparatus 110 for an optical line when the optical communication network illustrated in FIG. 1 is extended for a plurality of subscribers, according to an embodiment of the present invention. Accordingly, it will be obvious to those of ordinary skill in the art that the flowchart of FIG. 10 may be referred to for operations of the optical communication network according to the current embodiment.

Referring to FIG. 4, the optical communication network includes a central base station 100 and a local base station 200 which communicate with each other through a first optical fiber 151, and a plurality of subscriber terminals 300-1 through 300-N which communicate with the local base station 200 through a plurality of second optical fibers 171-1 through 171-N.

The central base station 100 includes the fault localization apparatus 110, a downstream light source 112 which converts a downstream data signal into an optical signal and outputs the optical signal, an optical circulator 114, and a downstream data signal output unit 116.

The fault localization apparatus 110 includes a monitoring pulse signal transmission unit 120 which modulates a monitoring pulse signal to a signal of a certain frequency band having no interference with the frequency band of the downstream data signal, a coupler 111 which combines the modulated monitoring pulse signal and the downstream data signal and outputs the combined signal to the downstream light source 112, and a monitoring pulse signal reception unit 130 which detects the position of the fault in the optical line by extracting the monitoring pulse signal from the optical signal input through the first optical fiber 151.

The monitoring pulse signal transmission unit 120 includes a control unit 121, a monitoring pulse signal generation unit 122, and a frequency up-converter 123.

The monitoring pulse signal reception unit 130 includes an optical reception unit 131, a filter 132, a frequency down-converter 133, and a fault detection unit 134.

The local base station 200 includes an optical splitter 210.

In the monitoring pulse signal transmission unit 120, the monitoring pulse signal generation unit 122 generates the monitoring pulse signal in accordance with a control signal of the control unit 121. The control unit 121 may control the monitoring pulse signal to be generated at a predetermined interval. The monitoring pulse signal output from the monitoring pulse signal generation unit 122 is modulated to the signal of the certain frequency band having no interference with the frequency band of the downstream data signal and is converted into an SCM monitoring pulse signal by the frequency up-converter 123. The SCM monitoring pulse signal is transmitted to the coupler 111.

The coupler 111 is disposed between the downstream light source 112 and the downstream data signal output unit 116 and receives the SCM monitoring pulse signal from the frequency up-converter 123. The coupler 111 combines the SCM monitoring pulse signal and the downstream data signal output from the downstream data signal output unit 116, and outputs the combined signal to the downstream light source 112.

The downstream light source 112 outputs a modulated optical signal and transmits the modulated optical signal to the optical circulator 114.

The optical circulator 114 transmits the optical signal through the first optical fiber 151.

The local base station 200 receives the optical signal obtained by combining the downstream data signal and the SCM monitoring pulse signal through the first optical fiber 151. The optical splitter 210 power-splits the received optical signal and transmits a split signal to each of the subscriber terminals 300-1 through 300-N through the respective second optical fibers 171-1 through 171-N.

If a fault occurs in the second optical fibers 171-1 through 171-N, a reflected signal of the optical signal is input from the optical splitter 210 of the local base station 200 to the central base station 100 through the first optical fiber 151.

The optical circulator 114 of the central base station 100 transmits the reflected optical signal to the monitoring pulse signal reception unit 130.

In the monitoring pulse signal reception unit 130, the optical reception unit 131 receives the reflected optical signal.

Since the reflected optical signal includes both the downstream data signal and the SCM monitoring pulse signal, the filter 132 filters only the SCM monitoring pulse signal. Since the SCM monitoring pulse signal is modulated to a signal of the certain frequency band having no interference with the frequency band of the downstream data signal, the SCM monitoring pulse signal may be filtered by an electrical BPF. The frequency down-converter 133 demodulates the filtered SCM monitoring pulse signal to a signal of an original frequency band, that is, a baseband. The demodulated monitoring pulse signal is input to the fault detection unit 134. The fault detection unit 134 detects the position of the fault in the optical line of the second optical fibers 171-1 through 171-N as well as the first optical fiber 151 by analyzing waveforms of the demodulated monitoring pulse signal. The analyzing of the waveforms and the detecting of the position of the fault may be performed by using any one of various well-known methods.

Output spectrums of the coupler 111 of the central base station 100 into which the SCM monitoring pulse signal is input, according to the current embodiment, may be the same as the output spectrums illustrated in FIGS. 2A and 2B.

Figure 5:
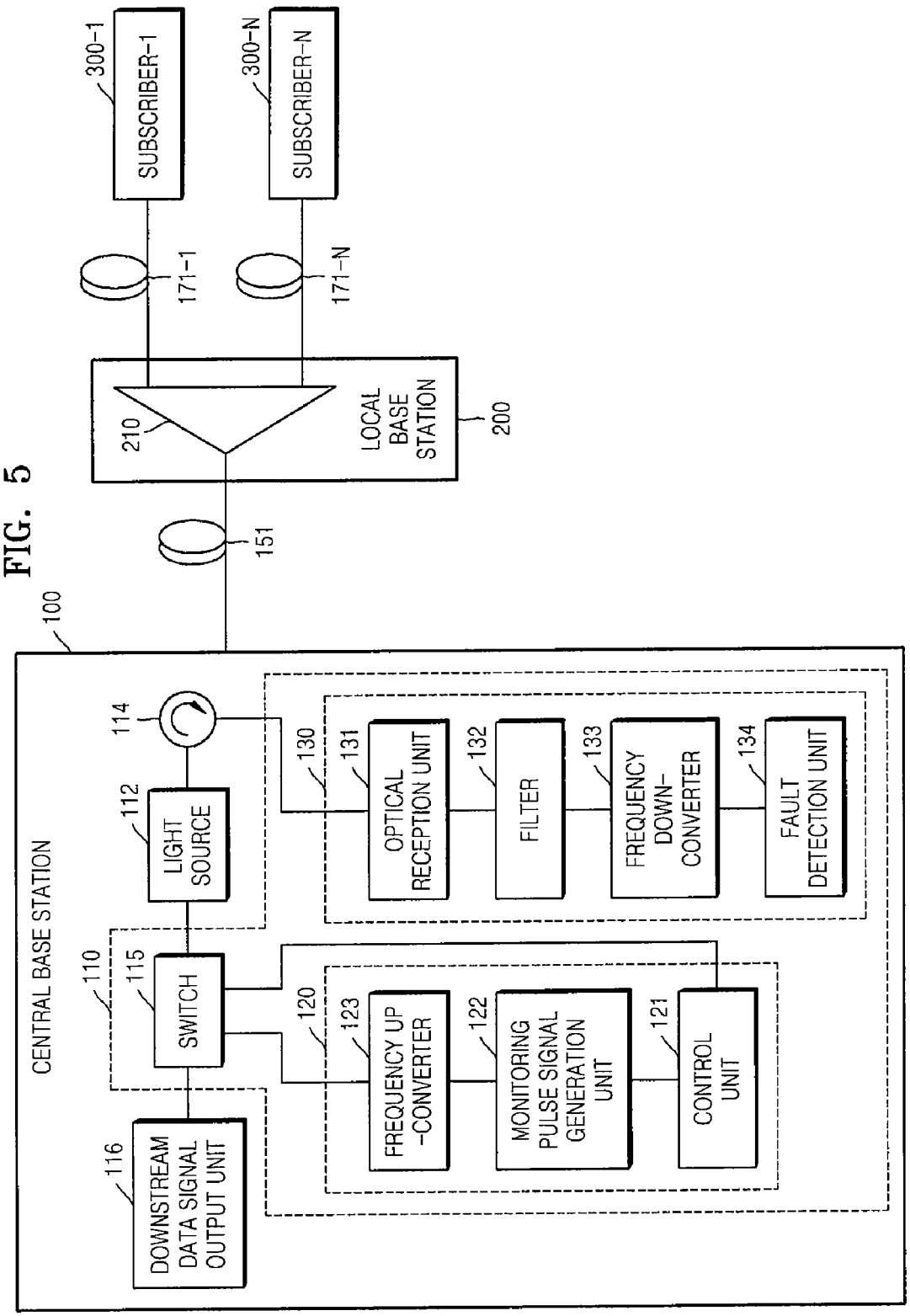
FIG. 5 is a block diagram of an optical communication network including a fault localization apparatus for an optical line when the optical communication network illustrated in FIG. 3 is extended for a plurality of subscribers, according to an embodiment of the present invention.

FIG. 5 is a block diagram of an optical communication network including a fault localization apparatus 110 for an optical line when the optical communication network illustrated in FIG. 3 is extended for a plurality of subscribers, according to an embodiment of the present invention. Accordingly, it will be obvious to those of ordinary skill in the art that the flowchart of FIG. 11 may be referred to for operations of the optical communication network according to the current embodiment.

Referring to FIG. 5, the optical communication network includes a central base station 100 and a local base station 200 which communicate with each other through a first optical fiber 151, and a plurality of subscriber terminals 300-1 through 300-N which communicate with the local base station 200 through a plurality of second optical fibers 171-1 through 171-N.

The central base station 100 includes the fault localization apparatus 110, a downstream light source 112 which converts a downstream data signal into an optical signal and outputs the optical signal, an optical circulator 114, and a downstream data signal output unit 116.

The fault localization apparatus 110 includes a monitoring pulse signal transmission unit 120 which modulates a monitoring pulse signal to a signal of a certain frequency band having no interference with the frequency band of the downstream data signal, a switch 115 which outputs one of the modulated monitoring pulse signal and the downstream data signal to the downstream light source 112, and a monitoring pulse signal reception unit 130 which detects the position of the fault in the optical line by extracting the monitoring pulse signal from the optical signal input through the first optical fiber 151.

The monitoring pulse signal transmission unit 120 includes a control unit 121, a monitoring pulse signal generation unit 122, and a frequency up-converter 123.

The monitoring pulse signal reception unit 130 includes an optical reception unit 131, a filter 132, a frequency down-converter 133, and a fault detection unit 134.

The local base station 200 includes an optical splitter 210.

In the monitoring pulse signal transmission unit 120, the monitoring pulse signal generation unit 122 generates the monitoring pulse signal in accordance with a control signal of the control unit 121. The control unit 121 may control the monitoring pulse signal to be generated at a predetermined interval. The monitoring pulse signal output from the monitoring pulse signal generation unit 122 is modulated to the signal of the certain frequency band having no interference with the frequency band of the downstream data signal and is converted into an SCM monitoring pulse signal by the frequency up-converter 123. The SCM monitoring pulse signal is transmitted to the switch 115.

The switch 115 is disposed between the downstream light source 112 and the downstream data signal output unit 116 and receives the SCM monitoring pulse signal from the frequency up-converter 123. The switch 115 selects one of the downstream data signal and the SCM monitoring pulse signal in accordance with a control signal of the control unit 121 and outputs the selected signal to the downstream light source 112. When the downstream data signal to be transmitted does not exist, the control unit 121 may control the SCM monitoring pulse signal to be transmitted at a predetermined interval so as to minimize the delay of the downstream data signal.

The downstream light source 112 outputs a modulated optical signal and transmits the modulated optical signal to the optical circulator 114.

The optical circulator 114 transmits the optical signal through the first optical fiber 151.

The local base station 200 receives the optical signal obtained by combining the downstream data signal and the SCM monitoring pulse signal through the first optical fiber 151. The optical splitter 210 power-splits the received optical signal and transmits a split signal to each of the subscriber terminals 300-1 through 300-N through the respective second optical fibers 171-1 through 171-N.

If a fault occurs in the second optical fibers 171-1 through 171-N, a reflected signal of the optical signal is input from the optical splitter 210 of the local base station 200 to the central base station 100 through the first optical fiber 151.

The optical circulator 114 of the central base station 100 transmits the reflected optical signal to the monitoring pulse signal reception unit 130.

In the monitoring pulse signal reception unit 130, the optical reception unit 131 receives the reflected optical signal. Since the reflected optical signal may include both of the downstream data signal and the SCM monitoring pulse signal, the filter 132 filters only the SCM monitoring pulse signal. Since the SCM monitoring pulse signal is modulated to the signal of the certain frequency band having no interference with the frequency band of the downstream data signal, the SCM monitoring pulse signal may be filtered by an electrical BPF. The frequency down-converter 133 demodulates the filtered SCM monitoring pulse signal to a signal of an original frequency band, that is, a baseband. The demodulated monitoring pulse signal is input to the fault detection unit 134. The fault detection unit 134 detects the position of the fault in the optical line of the second optical fibers 171-1 through 171-N as well as the first optical fiber 151 by analyzing waveforms of the demodulated monitoring pulse signal. The analyzing of the waveforms and the detecting of the position of the fault may be performed by using any one of various well-known methods.

Output spectrums of the switch 115 of the central base station 100 into which the SCM monitoring pulse signal is input, according to the current embodiment, may be the same as the output spectrums illustrated in FIGS. 2A and 2B.

Figure 6:
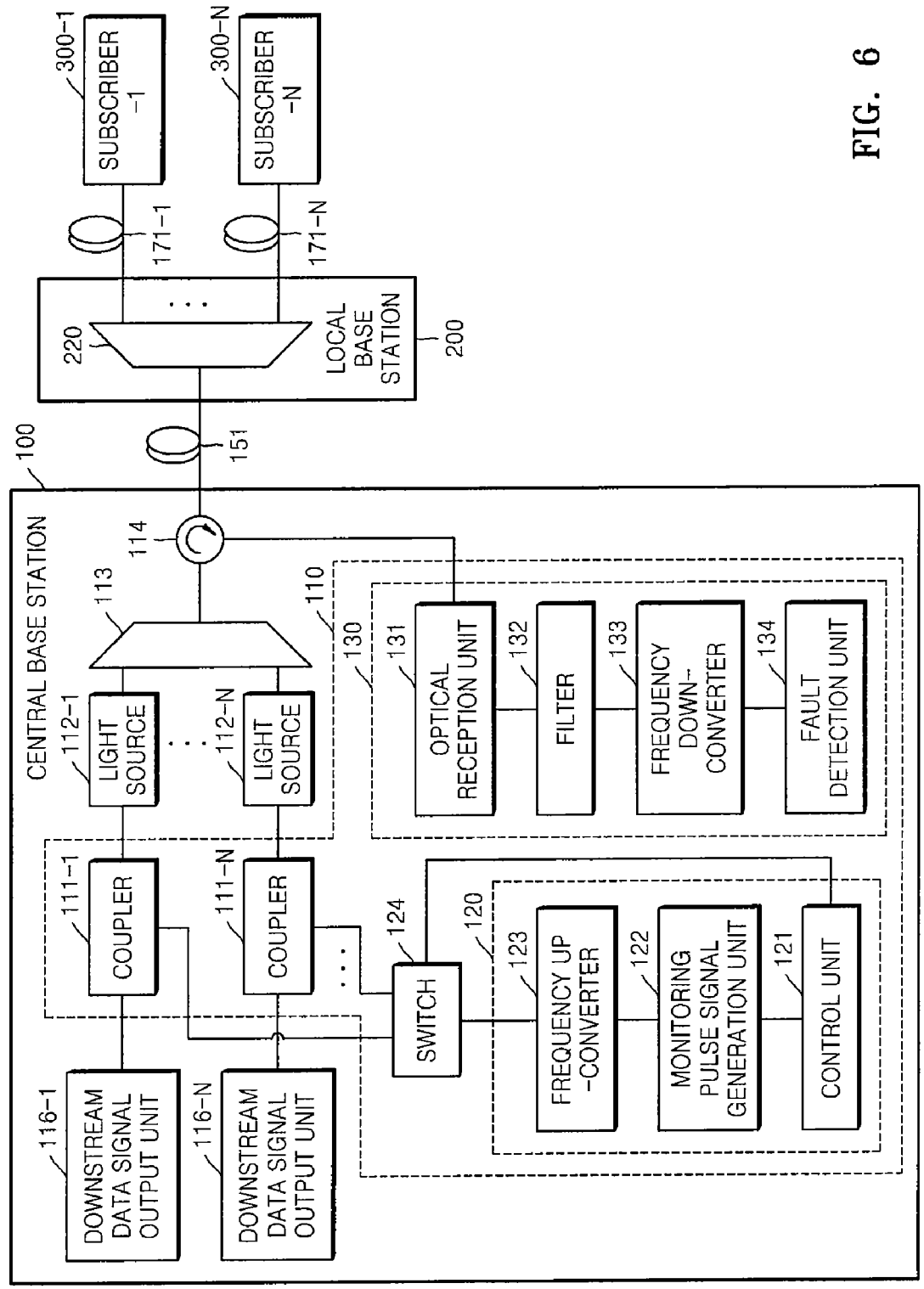
FIG. 6 is a block diagram of an optical communication network including a fault localization apparatus for an optical line, according to another embodiment of the present invention.
Figure 12:
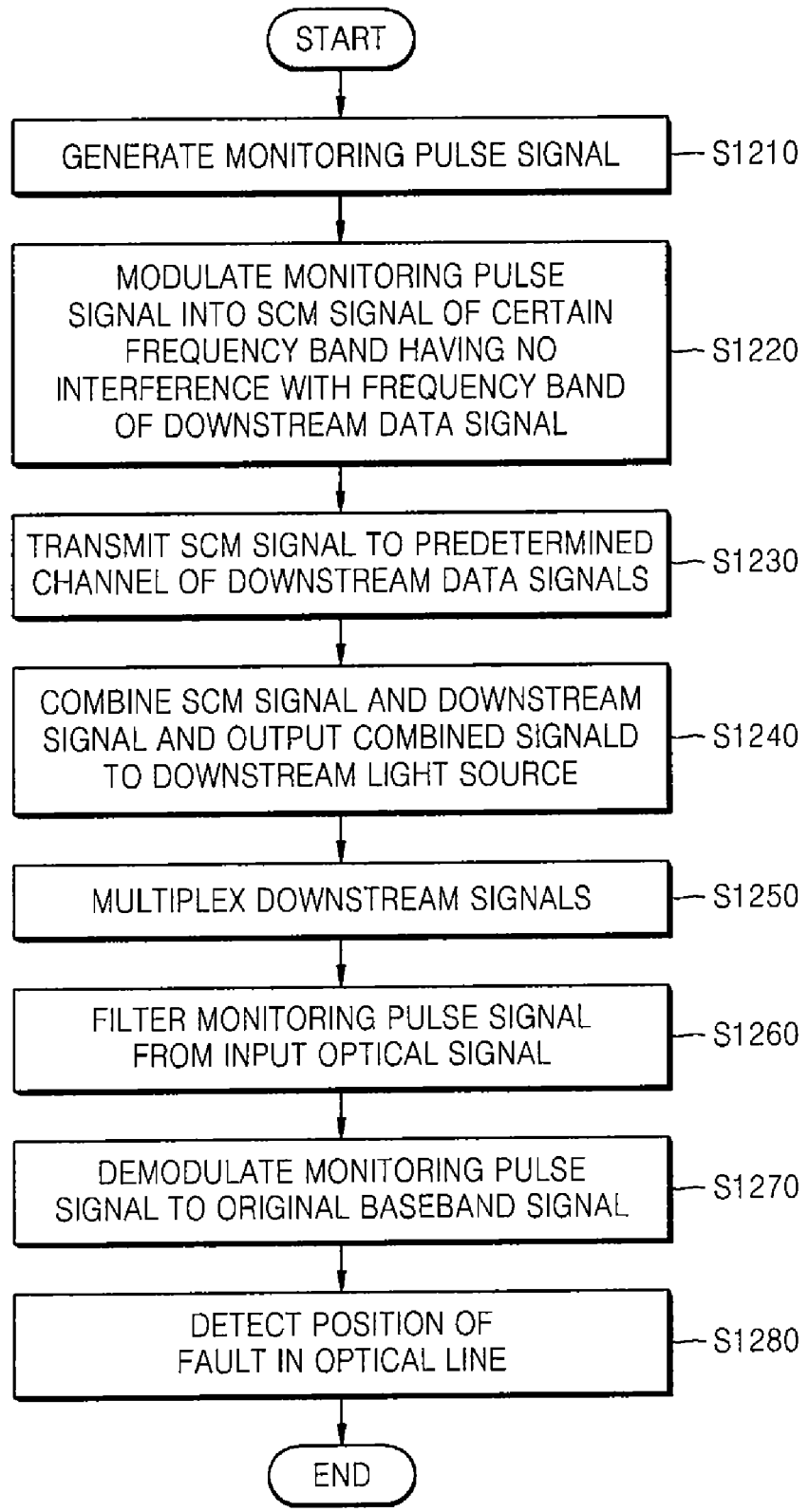

FIG. 6 is a block diagram of an optical communication network including a fault localization apparatus 110 for an optical line, according to another embodiment of the present invention. FIG. 12 is a flowchart of a fault localization method for an optical line, according to an embodiment of the present invention. Operations of the optical communication network illustrated in FIG. 6 will now be described in conjunction with the flowchart of FIG. 12.

Referring to FIG. 6, the optical communication network includes a central base station 100 and a local base station 200 which communicate with each other through a first optical fiber 151, and a plurality of subscriber terminals 300-1 through 300-N which communicate with the local base station 200 through a plurality of second optical fibers 171-1 through 171-N.

The central base station 100 includes the fault localization apparatus 110, a plurality of downstream light sources 112-1 through 112-N, a multiplexer 113 which multiplexes a plurality of downstream data signals in different channels to each other, an optical circulator 114, and a plurality of downstream data signal output units 116-1 through 116-N.

The fault localization apparatus 110 includes a monitoring pulse signal transmission unit 120 which modulates a monitoring pulse signal to a signal of a certain frequency band having no interference with a frequency band of the downstream data signals, a switch 124 which transmits the modulated monitoring pulse signal to one of the channels of the downstream data signals, a plurality of couplers 111-1 through 111-N which combine the modulated monitoring pulse signal and the downstream data signals and outputs the combined signals to the downstream light sources 112-1 through 112-N, and a monitoring pulse signal reception unit 130 which detects the position of the fault in the optical line by extracting the monitoring pulse signal from an optical signal input through the first optical fiber 151.

The couplers 111-1 through 111-N are disposed between the downstream data signal output units 116-1 through 116-N and the downstream light sources 112-1 through 112-N, respectively.

The monitoring pulse signal transmission unit 120 includes a control unit 121, a monitoring pulse signal generation unit 122, and a frequency up-converter 123.

The monitoring pulse signal reception unit 130 includes an optical reception unit 131, a filter 132, a frequency down-converter 133, and a fault detection unit 134.

The local base station 200 includes an optical wavelength multiplexer/optical wavelength demultiplexer 220.

In the monitoring pulse signal transmission unit 120, the monitoring pulse signal generation unit 122 generates the monitoring pulse signal in accordance with a control signal of the control unit 121 in operation S1210. The control unit 121 may control the monitoring pulse signal to be generated at a predetermined interval. The monitoring pulse signal output from the monitoring pulse signal generation unit 122 is modulated to a signal of the certain frequency band having no interference with the frequency band of the downstream data signals and is converted into an SCM monitoring pulse signal by the frequency up-converter 123 in operation S1220. The SCM monitoring pulse signal is transmitted to the switch 124.

The switch 124 is disposed at an output of the frequency up-converter 123. The switch 124 transmits the received SCM monitoring pulse signal to one of the couplers 111-1 through 111-N in accordance with a control signal of the control unit 121 in operation S1230. The control unit 121 controls the SCM monitoring pulse signal to be periodically transmitted to each of the couplers 111-1 through 111-N in a predetermined order.

Each of the couplers 111-1 through 111-N receives the SCM monitoring pulse signal, combines the SCM monitoring pulse signal and a downstream data signal output from a corresponding channel of the downstream data signal output units 116-1 through 116-N, and outputs the combined signal to a corresponding channel of the downstream light sources 112-1 through 112-N in operation S1240.

The multiplexer 113 multiplexes a plurality of optical signals output from the downstream light sources 112-1 through 112-N and transmits the optical signals to the optical circulator 114 in operation S1250.

The optical circulator 114 transmits the optical signals through the first optical fiber 151.

The local base station 200 receives the optical signals obtained by combining the downstream data signals and the SCM monitoring pulse signal through the first optical fiber 151. The received optical signals are demultiplexed by wavelengths and are transmitted to the corresponding subscriber terminals 300-1 through 300-N through the respective second optical fibers 171-1 through 171-N.

If a fault occurs in the second optical fibers 171-1 through 171-N, a reflected signal of the optical signal is input from the optical wavelength multiplexer/optical wavelength demultiplexer 220 of the local base station 200 to the central base station 100 through the first optical fiber 151.

The optical circulator 114 of the central base station 100 transmits the reflected optical signal to the monitoring pulse signal reception unit 130.

In the monitoring pulse signal reception unit 130, the optical reception unit 131 receives the reflected optical signal. Since the reflected optical signal includes both of the downstream data signal and the SCM monitoring pulse signal, the filter 132 filters only the SCM monitoring pulse signal in operation S1260. Since the SCM monitoring pulse signal is modulated to a signal of the certain frequency band having no interference with the frequency band of the downstream data signals, the SCM monitoring pulse signal may be filtered by an electrical BPF. The frequency down-converter 133 demodulates the filtered SCM monitoring pulse signal to a signal of an original frequency band, that is, a baseband in operation S1270. The demodulated monitoring pulse signal is input to the fault detection unit 134. The fault detection unit 134 detects the position of the fault in the optical line of the second optical fibers 171-1 through 171-N as well as the first optical fiber 151 by analyzing waveforms of the demodulated monitoring pulse signal in operation S1280. The analyzing of the waveforms and the detecting of the position of the fault may be performed by using any one of various well-known methods.

Output spectrums of one of the couplers 111-1 through 111-N of the central base station 100 into which the SCM monitoring pulse signal is input, according to the current embodiment, may be the same as the output spectrums illustrated in FIGS. 2A and 2B.

Figure 7:
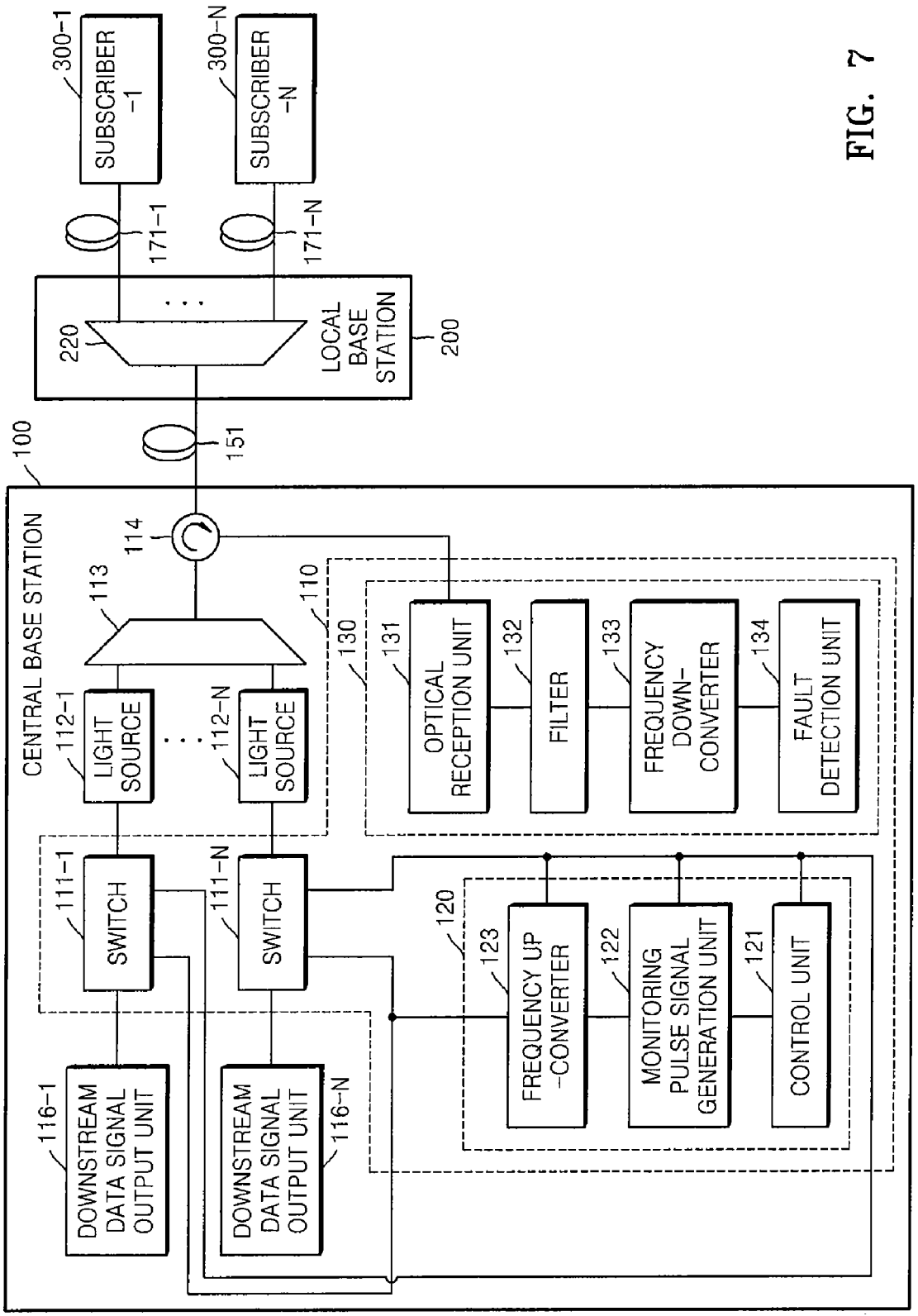
FIG. 7 is a block diagram of an optical communication network including a fault localization apparatus for an optical line, according to another embodiment of the present invention.

FIG. 7 is a block diagram of an optical communication network including a fault localization apparatus 110 for an optical line, according to another embodiment of the present invention. It will be obvious to those of ordinary skill in the art that the flowchart of FIG. 11 may be referred to for operations of the optical communication network according to the current embodiment.

Referring to FIG. 7, the optical communication network includes a central base station 100 and a local base station 200 which communicate with each other through a first optical fiber 151, and a plurality of subscriber terminals 300-1 through 300-N which communicate with the local base station 200 through a plurality of second optical fibers 171-1 through 171-N.

The central base station 100 includes the fault localization apparatus 110, a plurality of downstream light sources 112-1 through 112-N, a multiplexer 113 which multiplexes a plurality of downstream data signals in different channels to each other, an optical circulator 114, and a plurality of downstream data signal output units 116-1 through 116-N.

The fault localization apparatus 110 includes a monitoring pulse signal transmission unit 120 which modulates a monitoring pulse signal to a signal of a certain frequency band having no interference with a frequency band of the downstream data signals, a plurality of switches 115-1 through 115-N which output one of the modulated monitoring pulse signal and the downstream data signals to the downstream light sources 112-1 through 112-N, and a monitoring pulse signal reception unit 130 which detects the position of the fault in the optical line by extracting the monitoring pulse signal from an optical signal input through the first optical fiber 151.

The switches 115-1 through 115-N are disposed between the downstream data signal output units 116-1 through 116-N and the downstream light sources 112-1 through 112-N, respectively.

The monitoring pulse signal transmission unit 120 includes a control unit 121, a monitoring pulse signal generation unit 122, and a frequency up-converter 123.

The monitoring pulse signal reception unit 130 includes an optical reception unit 131, a filter 132, a frequency down-converter 133, and a fault detection unit 134.

The local base station 200 includes an optical wavelength multiplexer/optical wavelength demultiplexer 220.

In the monitoring pulse signal transmission unit 120, the monitoring pulse signal generation unit 122 generates the monitoring pulse signal in accordance with a control signal of the control unit 121. The control unit 121 may control the monitoring pulse signal to be generated at a predetermined interval. The monitoring pulse signal output from the monitoring pulse signal generation unit 122 is modulated to a signal of the certain frequency band having no interference with the frequency band of the downstream data signals and is converted into an SCM monitoring pulse signal by the frequency up-converter 123. The SCM monitoring pulse signal is transmitted to one of the switches 115-1 through 115-N in accordance with a control signal. The control unit 121 controls the SCM monitoring pulse signal to be periodically transmitted to each of the switches 115-1 through 115-N in a predetermined order.

One of the switches 115-1 through 115-N in a channel which receives the SCM monitoring pulse signal selects one of the SCM monitoring pulse signal and a downstream data signal output from one of the downstream data signal output units 116-1 through 116-N in the corresponding channel in accordance with a control signal of the control unit 121 and outputs the selected signal to one of the downstream light sources 112-1 through 112-N in the corresponding channel. When the downstream data signal to be transmitted does not exist, the control unit 121 may control the SCM monitoring pulse signal to be transmitted at a predetermined interval so as to minimize the delay of the downstream data signal.

Each of the downstream light sources 112-1 through 112-N outputs the SCM monitoring pulse signal or the downstream data signal as an optical signal.

The multiplexer 113 multiplexes a plurality of optical signals output from the downstream light sources 112-1 through 112-N and transmits the optical signals to the optical circulator 114.

The optical circulator 114 transmits the optical signals through the first optical fiber 151.

The local base station 200 receives the optical signals obtained by combining the downstream data signals and the SCM monitoring pulse signal through the first optical fiber 151. The received optical signals are demultiplexed by wavelengths and are transmitted to the corresponding subscriber terminals 300-1 through 300-N through the respective second optical fibers 171-1 through 171-N.

If a fault occurs in the second optical fibers 171-1 through 171-N, a reflected signal of the optical signal is input from the optical wavelength multiplexer/optical wavelength demultiplexer 220 of the local base station 200 to the central base station 100 through the first optical fiber 151.

The optical circulator 114 of the central base station 100 transmits the reflected optical signal to the monitoring pulse signal reception unit 130.

In the monitoring pulse signal reception unit 130, the optical reception unit 131 receives the reflected optical signal. Since the reflected optical signal includes both of the downstream data signal and the SCM monitoring pulse signal, the filter 132 filters only the SCM monitoring pulse signal. Since the SCM monitoring pulse signal is modulated to a signal of the certain frequency band having no interference with the frequency band of the downstream data signals, the SCM monitoring pulse signal may be filtered by an electrical BPF. The frequency down-converter 133 demodulates the filtered SCM monitoring pulse signal to a signal of an original frequency band, that is, a baseband. The demodulated monitoring pulse signal is input to the fault detection unit 134. The fault detection unit 134 detects the position of the fault in the optical line of the second optical fibers 171-1 through 171-N as well as the first optical fiber 151 by analyzing waveforms of the demodulated monitoring pulse signal. The analyzing of the waveforms and the detecting of the position of the fault may be performed by using any one of various well-known methods.

Output spectrums of one of the switches 115-1 through 115-N of the central base station 100 into which the SCM monitoring pulse signal is input, according to the current embodiment, may be the same as the output spectrums illustrated in FIGS. 2A and 2B.

Figure 8:
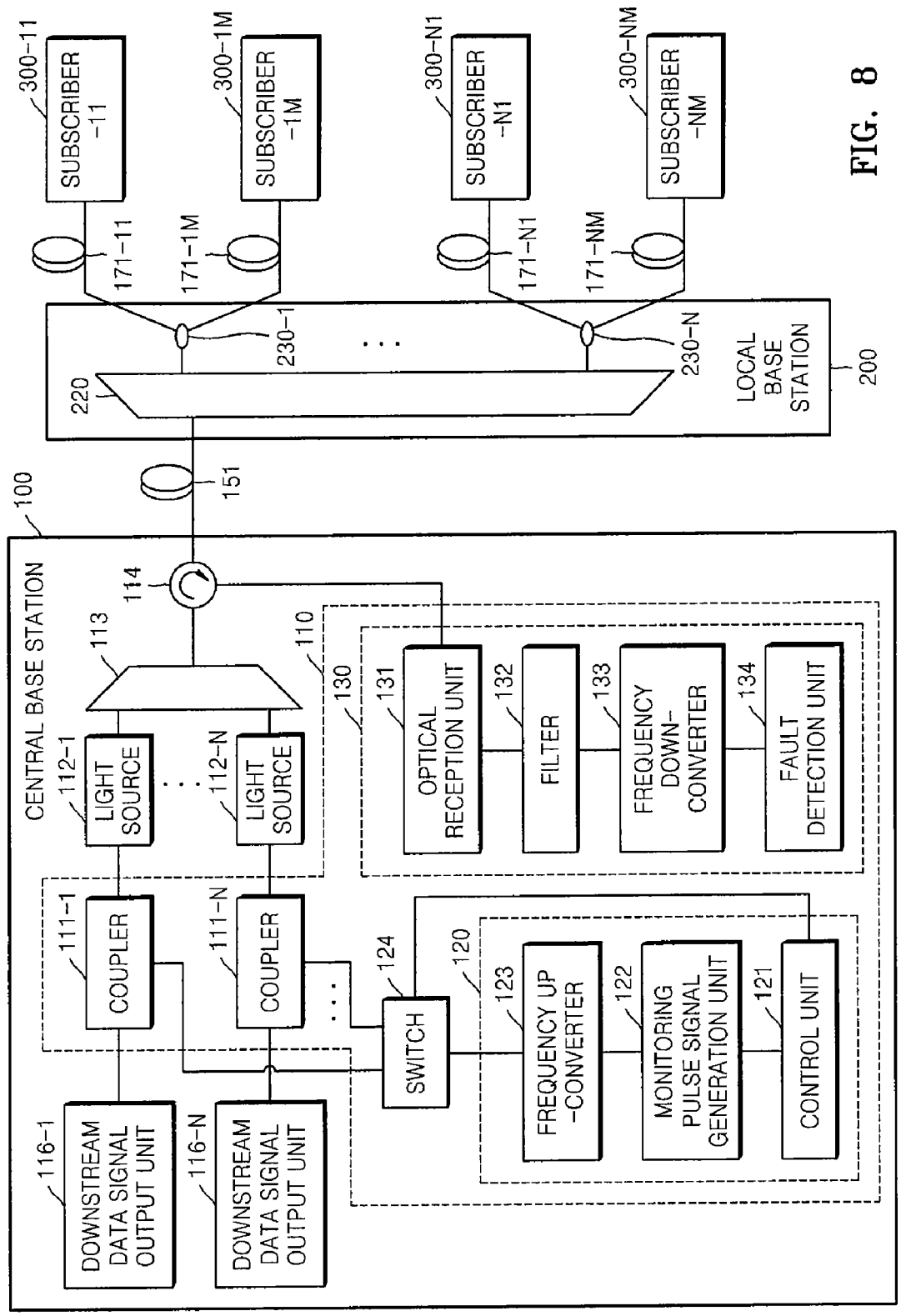
FIGS. 8 and 9 are block diagrams of an optical communication network including a fault localization apparatus for an optical line when the optical communication networks illustrated in FIGS. 6 and 7 are extended, respectively, so that the number of subscriber terminals are increased M times by including N optical splitters between an optical wavelength multiplexer/optical wavelength demultiplexer and a plurality of second optical fibers, according to embodiments of the present invention.
Figure 9:
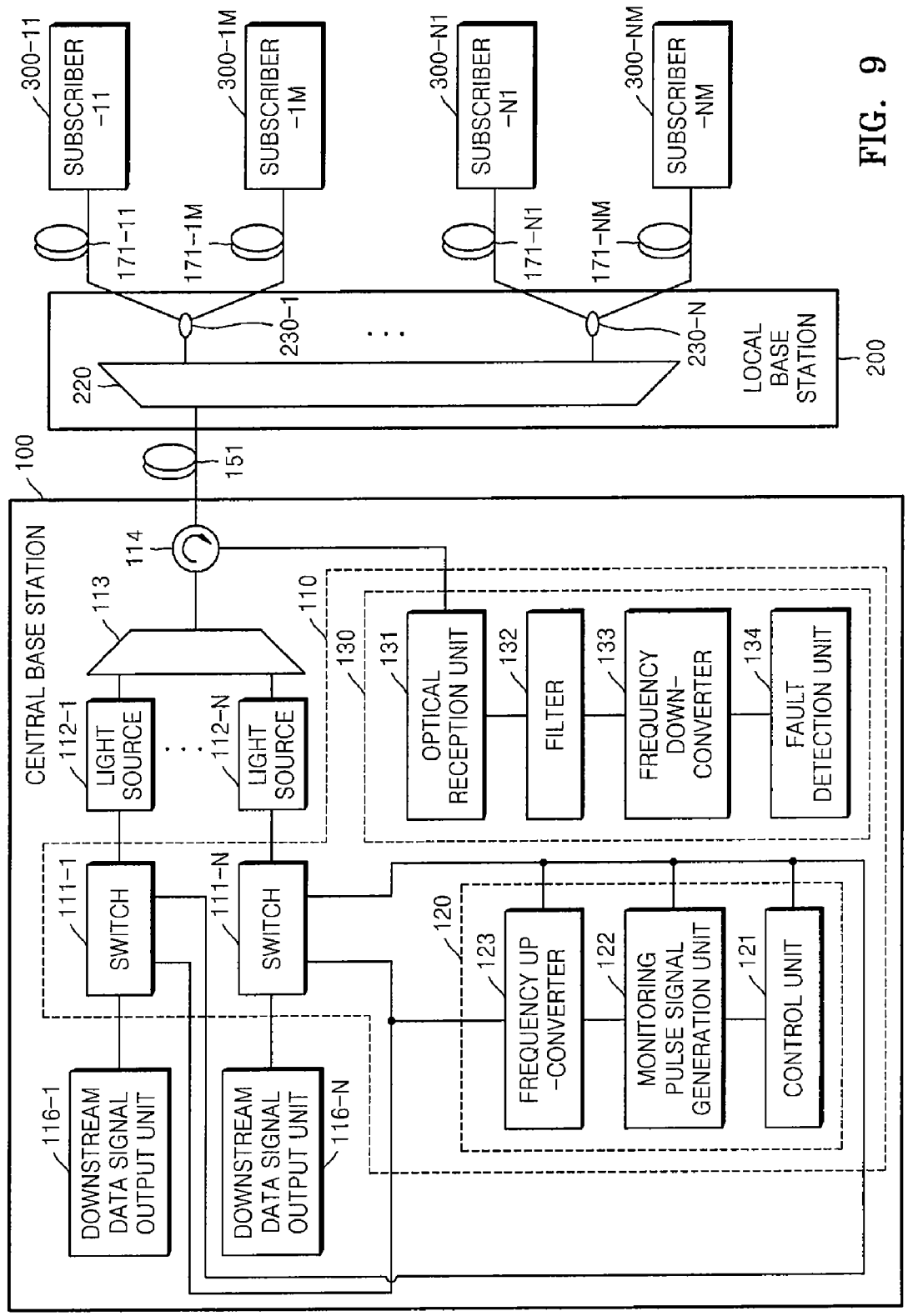

FIGS. 8 and 9 are block diagrams of an optical communication network including a fault localization apparatus 110 for an optical line when the optical communication networks illustrated in FIGS. 6 and 7 are extended, respectively, so that the number of subscriber terminals 300-11 through 300-NM are increased M times by including N optical splitters 230-1 through 230-N between an optical wavelength multiplexer/optical wavelength demultiplexer 220 and a plurality of second optical fibers 171-11 through 171-NM, according to embodiments of the present invention.

Operations of the optical communication networks illustrated in FIGS. 8 and 9 are the same as the operations of the optical communication networks illustrated in FIGS. 6 and 7 except for the structure of the optical communication networks and thus, detailed descriptions thereof will be omitted.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Functional programs, code, and code segments for accomplishing the present invention can be easily construed by programmers skilled in the art to which the present invention pertains.

As described above, according to the present invention, since a downstream light source of a central base station is used to generate a monitoring optical signal, an additional monitoring light source is not necessary. Also, since a monitoring pulse signal is transmitted and received by being modulated into an SCM monitoring pulse signal of a certain frequency band having no interference with a frequency band of a downstream data signal, the monitoring pulse signal may be extracted by using an electrical BPF instead of an expensive optical BPF for attenuation of the monitoring light source and thus a fault position may be detected at low cost.

Furthermore, the present invention may be applied to a wavelength division multiplexed-passive optical network (WDM-PON). In this case, since the monitoring pulse signal is transmitted and received by being modulated into the SCM monitoring pulse signal of the certain frequency band having no interference with the frequency band of the downstream data signal, it is not necessary to use a tunable BPF at an input terminal of a monitoring pulse signal reception unit and thus a fault position may be detected at low cost.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A fault localization apparatus for an optical line in an optical communication network between a subscriber and a central base station which multiplexes a plurality of downstream data signals, the apparatus comprising:
   a monitoring pulse signal transmission unit configured to modulate a monitoring pulse signal to a signal of a certain frequency band having substantially no interference with a frequency band of the downstream data signals;
   a switch configured to transmit the modulated monitoring pulse signal to one of a plurality of channels of the downstream data signals;
   a plurality of couplers each of which is disposed at each channel of the downstream data signals, combines the modulated monitoring pulse signal and a downstream data signal input thereto, and outputs the combined signal to a corresponding downstream light source; and
   a monitoring pulse signal reception unit configured to detect a position of a fault occurring in the optical line by extracting the monitoring pulse signal from a reflected optical signal input through an optical fiber through which the subscriber communicates with the central base station.

2. The fault localization apparatus of claim 1, wherein the monitoring pulse signal transmission unit comprises:
   a monitoring pulse signal generation unit configured to generate the monitoring pulse signal;
   a frequency up-converter configured to modulate the monitoring pulse signal into a subcarrier multiplexing (SCM) signal of the certain frequency band having substantially no interference with the frequency band of the downstream data signals; and
   a control unit configured to control the monitoring pulse signal generation unit to generate the monitoring pulse signal, and to control the switch to select one of the couplers.

3. The fault localization apparatus of claim 1, wherein the monitoring pulse signal reception unit comprises:
   an optical reception unit configured to receive the reflected optical signal input through the optical fiber by reflecting the optical signal output from the downstream light source to the optical fiber;
   a filter configured to filter the monitoring pulse signal from the reflected optical signal;
   a frequency down-converter configured to demodulate the filtered monitoring pulse signal to a signal of an original frequency band; and
   a fault detection unit configured to detect the position of the fault occurring in the optical line based on the demodulated monitoring pulse signal.

4. The fault localization apparatus of claim 1, wherein the switch is disposed at an output of the monitoring pulse signal transmission unit.

5. The fault localization apparatus of claim 1, further comprising a multiplexer configured to multiplex the rest of the plurality of downstream data signals and the downstream data signal combined with the modulated monitoring pulse signal output from a plurality of downstream light sources corresponding to the plurality of channels of the downstream data signals.

6. A fault localization method for an optical line in an optical communication network between a central base station and a subscriber, the method comprising:
   modulating a monitoring pulse signal to a signal of a certain frequency band having substantially no interference with a frequency band of a plurality of downstream data signals, using a monitoring pulse signal transmission unit;
   inputting the modulated monitoring pulse signal to one of a plurality of channels of the downstream data signals, using a switch;
   combining the modulated monitoring pulse signal and a selected downstream data signal and outputting the combined signal to a corresponding downstream light source; and
   detecting a position of a fault occurring in the optical line by extracting the monitoring pulse signal from a reflected optical signal input through an optical fiber through which the central base station communicates with the subscriber,
   wherein the switch connects the monitoring pulse signal transmission unit with a plurality of couplers, each of which is disposed at each channel of the downstream data signals, to transmit the modulated monitoring pulse signal to a selected one of the plurality of couplers.

7. The method of claim 6, wherein the modulating of the monitoring pulse signal comprises:
   generating the monitoring pulse signal in accordance with a control signal; and
   modulating the monitoring pulse signal into a subcarrier multiplexing (SCM) signal of the certain frequency band having substantially no interference with the frequency band of the downstream data signals.

8. The method of claim 6, wherein the detecting of the position of the fault comprises:
   receiving the reflected optical signal input through the optical signal by reflecting the optical signal output from the downstream light source to the optical fiber;
   filtering the monitoring pulse signal from the reflected optical signal;
   demodulating the filtered monitoring pulse signal to a signal of an original frequency band; and
   detecting the position of the fault occurring in the optical line based on the demodulated monitoring pulse signal.

9. The method of claim 6, further comprising multiplexing the remaining plurality of downstream data signals and the selected downstream data signal combined with the modulated monitoring pulse signal.

* * * * *